(12) United States Patent
Rafii et al.

(10) Patent No.: US 11,651,776 B2
(45) Date of Patent: May 16, 2023

(54) METHODS, APPARATUS AND ARTICLES OF MANUFACTURE TO IDENTIFY SOURCES OF NETWORK STREAMING SERVICES

(71) Applicant: THE NIELSEN COMPANY (US), LLC, New York, NY (US)

(72) Inventors: Zafar Rafii, Berkeley, CA (US); Markus Cremer, Orinda, CA (US); Bongjun Kim, Evanston, IL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 45 days.

(21) Appl. No.: 16/984,091

(22) Filed: Aug. 3, 2020

(65) Prior Publication Data
US 2021/0027792 A1    Jan. 28, 2021

Related U.S. Application Data

(63) Continuation of application No. 15/793,543, filed on Oct. 25, 2017, now Pat. No. 10,733,998.

(51) Int. Cl.
*G10L 19/00* (2013.01)
*G10L 19/008* (2013.01)
(Continued)

(52) U.S. Cl.
CPC ............ *G10L 19/008* (2013.01); *G10L 25/51* (2013.01); *H04H 60/31* (2013.01); *H04H 60/58* (2013.01);
(Continued)

(58) Field of Classification Search
CPC .............................. H04H 60/43; H04H 60/44
See application file for complete search history.

(56) References Cited

U.S. PATENT DOCUMENTS 5,373,460 A    12/1994  Marks, II
6,820,141 B2   11/2004  Bennett
(Continued)

FOREIGN PATENT DOCUMENTS

GB          2474508           4/2011
KR    10-2014-0023389 A       2/2014
(Continued)

OTHER PUBLICATIONS

Guzman-Zavaleta, Z. Jezabel, et al. "A robust audio fingerprinting method using spectrograms saliency maps." The 9th international conference for internet technology and secured transactions (ICITST—2014). IEEE, 2014. (Year: 2014).*

(Continued)

*Primary Examiner* — Jialong He
(74) *Attorney, Agent, or Firm* — Hanley, Flight & Zimmerman, LLC

(57) ABSTRACT

Methods, apparatus and articles of manufacture to identify sources of network streaming services are disclosed. An example apparatus includes a coding format identifier to identify, from a received first audio signal representing a decompressed second audio signal, an audio compression configuration used to compress a third audio signal to form the second audio signal, and a source identifier to identify a source of the second audio signal based on the identified audio compression configuration.

14 Claims, 7 Drawing Sheets

(51) Int. Cl.
  *H04S 7/00* (2006.01)
  *G10L 25/51* (2013.01)
  *H04H 60/58* (2008.01)
  *H04H 60/31* (2008.01)
  *H04N 21/40* (2011.01)
  *G10L 19/032* (2013.01)
  *G10L 19/16* (2013.01)
  *H04H 20/82* (2008.01)
  *H04H 20/95* (2008.01)
  *H04R 27/00* (2006.01)

(52) U.S. Cl.
  CPC ............... *H04N 21/40* (2013.01); *H04S 7/30* (2013.01); *G10L 19/032* (2013.01); *G10L 19/167* (2013.01); *G10L 19/173* (2013.01); *G10L 2019/0001* (2013.01); *H04H 20/82* (2013.01); *H04H 20/95* (2013.01); *H04R 27/00* (2013.01); *H04R 2227/003* (2013.01)

(56) References Cited

U.S. PATENT DOCUMENTS

| | | |
|---|---|---|
| 7,742,737 B2 | 6/2010 | Peiffer et al. |
| 7,907,211 B2 | 3/2011 | Oostveen et al. |
| 8,351,645 B2 | 1/2013 | Srinivasan |
| 8,553,148 B2 | 10/2013 | Ramaswamy et al. |
| 8,559,568 B1 | 10/2013 | Clark |
| 8,639,178 B2 | 1/2014 | Anniballi et al. |
| 8,768,713 B2 | 7/2014 | Chaoui et al. |
| 8,825,188 B2 | 9/2014 | Stone et al. |
| 8,856,816 B2 | 10/2014 | Falcon |
| 8,965,774 B2 * | 2/2015 | Eppolito ............... H03G 7/007 715/716 |
| 9,049,496 B2 | 6/2015 | Raesig et al. |
| 9,313,359 B1 | 4/2016 | Stojancic et al. |
| 9,456,075 B2 | 9/2016 | Ponting et al. |
| 9,515,904 B2 | 12/2016 | Besehanic et al. |
| 9,641,892 B2 | 5/2017 | Panger et al. |
| 9,648,282 B2 | 5/2017 | Petrovic et al. |
| 9,837,101 B2 | 12/2017 | Bilobrov |
| 10,629,213 B2 | 4/2020 | Rafii et al. |
| 10,726,852 B2 | 7/2020 | Rafii |
| 10,733,998 B2 | 8/2020 | Rafii et al. |
| 11,049,507 B2 | 6/2021 | Rafii et al. |
| 11,430,454 B2 | 8/2022 | Rafii et al. |
| 2003/0026201 A1 | 2/2003 | Arnesen |
| 2003/0086341 A1 | 5/2003 | Wells et al. |
| 2005/0015241 A1 | 1/2005 | Baum |
| 2006/0025993 A1 | 2/2006 | Aarts et al. |
| 2008/0169873 A1 | 7/2008 | Toda |
| 2011/0244784 A1 * | 10/2011 | Wang ............... G10L 25/51 455/2.01 |
| 2013/0058522 A1 | 3/2013 | Raesig et al. |
| 2014/0088978 A1 | 3/2014 | Mundt et al. |
| 2014/0137146 A1 | 5/2014 | Topchy et al. |
| 2014/0336800 A1 | 11/2014 | Radhakrishnan et al. |
| 2015/0170660 A1 | 6/2015 | Han et al. |
| 2015/0222951 A1 | 8/2015 | Ramaswamy |
| 2015/0302086 A1 | 10/2015 | Roberts et al. |
| 2016/0196343 A1 | 7/2016 | Rafii |
| 2017/0048641 A1 | 2/2017 | Franck |
| 2017/0337926 A1 | 11/2017 | Chon et al. |
| 2018/0315435 A1 | 11/2018 | Goodwin et al. |
| 2018/0365194 A1 | 12/2018 | Grado et al. |
| 2019/0122673 A1 | 4/2019 | Rafii et al. |
| 2019/0139559 A1 | 5/2019 | Rafii et al. |
| 2020/0234722 A1 | 7/2020 | Rafii et al. |
| 2021/0027792 A1 | 1/2021 | Rafii et al. |

FOREIGN PATENT DOCUMENTS

| | | |
|---|---|---|
| WO | 2012/177870 A2 | 12/2012 |
| WO | 2019084065 | 5/2019 |

OTHER PUBLICATIONS

Todd et al., "AC-3: Flexible Perceptual Coding for Audio Transmission and Storage", presented at the 96th Convention of the Audio Engineering Society, Feb. 26-Mar. 1, 1994, 13 pages.

Brandenburg et al.,"ISO-MPEG-1 Audio: A Generic Standard for Coding of High-Quality Digital Audio", presented at the 92 Convention of the Audio Engineering Society, 1992; revised Jul. 15, 1994, 13 pages.

Brandenburg, Karlheinz, "MP3 and AAC Explained", presented at the Audio Engineering Society's 17th International Conference on High Quality Audio Coding, Sep. 2-5, 1999, 12 pages.

Herre et al., "Analysis of Decompressed Audio-The "Inverse Decoder"", presented at the 109th Convention of the Audio Engineering Society, Sep. 22-25, 2000, 24 pages.

Bosi et al., "Introduction to Digital Audio Coding and Standards", published by Kluwer Academic Publishers, 2003, 426 pages.

Yang et al., "Detecting Digital Audio Forgeries by Checking Frame Offsets", presented at the 10th annual ACM Multimedia & Security Conference, Sep. 22-23, 2008, 6 pages.

D'Alessandro et al., "MP3 Bit Rate Qualify Detection through Frequency Spectrum Analysis", presented at the 11th annual ACM Multimedia & Security Conference, Sep. 7-8, 2009, 5 pages.

Liu et al., "Detection of Double MP3 Compression", published in Cognitive Computation, May 22, 2010, 6 pages.

Hicsonmez et al., "Audio Codec Identification Through Payload Sampling", published in Information Forensics and Security (WIFS), 2011, 6 pages.

Advanced Television Systems Committee, "ATSC Standard: Digital Audio Compression (AC-3, E-AC-3)", Dec. 17, 2012, 270 pages.

Hicsonmez et al., "Methods for Identifying Traces of Compression in Audio", published online, URL: https://www.researchgate.net/publication/26199644, May 1, 2014, 7 pages.

Bianchi et al., "Detection and Classification of Double Compressed MP3 Audio Tracks", presented at the 1st annual AMC workshop on Information Hiding & Multimedia Security, Jun. 17-19, 2013, 6 pages.

Qiao et al., "Improved Detection of MP3 Double Compression using Content-Independent Features", published in Signal Processing, Communication and Computing (ICSPCC), 2013, 4 pages.

Korycki, Rafal, "Authenticity examination of compressed audio recordings using detection of multiple compression and encoders' identification", published in Forensic Science International, Feb. 7, 2014, 14 pages.

Gartner et al., "Efficient Cross-Codec Framing Grid Analysis for Audio Tampering Detection", presented at the 136th Audio Engineering Society Convention, Apr. 26-29, 2014, 11 pages.

Luo et al., "Identifying Compression History of Wave Audio and Its Applications", published in ACM Transactions on Multimedia Computing, Communications and Applications, vol. 10, No. 3, Article 30, Apr. 2014, 19 pages.

Hicsonmez et al. "Audio Codec Identification from Coded and Transcoded Audios," Digital Signal Processing 23.5, 2013: pp. 1720-1730 (11 pages).

Luo et al., "Identification of AMR decompressed audio," Digital Signal Processing vol. 37, 2015: pp. 85-91 (7 pages).

Yang et al., "Defeating Fake-Quality MP3", presented at the 11th annual ACM Multimedia & Security Conference, Sep. 7-8, 2009, 8 pages.

Moehrs et al., "Analysing decompressed audio with the "Inverse Decoder"—towards an operative algorithm", presented at the 112the Convention of the Audio Engineering Society, May 10-13, 2002, 22 pages.

xiph.org Foundation, "Vorbis I Specification", published Feb. 27, 2015, 74 pages.

Seichter et al., "AAC Encoding Detection and Bitrate Estimation Using a Convolutional Neural Network", published in Acoustics, Speech and Signal Processing (ICASSP), 2016, 5 pages.

Hennequin et al., "Codec Independent Lossy Audio Compression Detection", published in Accoustics, Speech and Signal Processing (ICASSP), 2017, 5 pages.

(56) References Cited

OTHER PUBLICATIONS

Kim et al., "Lossy Compression Identification from Audio Recordings, version 1", 5 pages.
Kim et al., "Lossy Compression Identification from Audio Recordings, version 2", 5 pages.
International Searching Authority, "International Search Report," issued in connection with application No. PCT/US2018/057183, dated Feb. 13, 2019, 5 pages.
International Searching Authority, "Written Opinion," issued in connection with application No. PCT/US2018/057183, dated Feb. 12, 2019, 4 pages.
United States Patent and Trademark Office, "Non-Final Office Action," issued in connection with U.S. Appl. No. 15/899,220, dated May 20, 2019, 10 pages.
Kim et al., "Lossy Audio Compression Identification," 2018 26th European Signal Processing Conference (EUSIPCO), 5 pages.
Kim et al., "Lossy Audio Compression Identification," EUSIPCO 2018, 1 page.
Jenner et al., "High Accurate Non-Intrusive Speech Forensics for Codec Identifications from Observed Decoded Signals," 2012 IEEE International Conference on Acoustics, Speech and Signal Processing (ICASSP), IEEE 2012, pp. 1737-1740, 4 pages.
United States Patent and Trademark Office, "Non-Final Office Action," dated Jul. 19, 2019 in connection with U.S. Appl. No. 15/942,369, 46 pages.
United States Patent and Trademark Office, "Final Office Action," issued in connection with U.S. Appl. No. 15/899,220, dated Nov. 25, 2019, 6 pages.
United States Patent and Trademark Office, "Notice of Allowance," issued in connection with U.S. Appl. No. 15/942,369, dated Dec. 13, 2019, 7 pages.
United States Patent and Trademark Office, "Notice of Allowance," issued in connection with U.S. Appl. No. 15/899,220, dated Feb. 11, 2020, 6 pages.
Barry Van Oudtshoorn, "Investigating the Feasibility of Near Real-Time Music Transcription on Mobile Devices," Honours Programme of the School of Computer Science and Software enginnering, The University of Western Australia, 2008, 50 pages.
Eric Jacobsen and Richard Lyons, "Sliding Spectrum Analysis," Streamlining digital Signal Processing: A Tricks of the Trade Guidebook, IEEE, Chapter 14, 2007, 13 pages.
Eric Jacobsen and Richard Lyons, "An update to the sliding DFT," IEEE Signal Processing Magazine, 2004, 3 pages.
Eric Jacobsen and Richard Lyons, "The Sliding DFT," IEEE Signal Processing Magazine, 1053-5888, Mar. 2003, p. 74-80, 7 pages.
Haitham Hassanieh, Piotr Indyk, Dina Katabi, and Eric Price, "Simple and Practical Algorithm for Sparse Fourier Transform," SODA '12 Proceedings of the Twenty-Third Annual Symposium on Discrete Algorithms, 12 pages.
Judith C. Brown and Miller S. Puckette, "An efficient algorithm for the calculation of a constant Q transform," J. Acoust. Soc, Am. 92 (5), Nov. 1992, pp. 2698-2701, 4 pages.
Judith C. Brown, "Calculation of a constant Q spectral transform," J. Acoust. Soc, Am. 89 (1), Jan. 1991, pp. 425-434, 10 pages.
Steve Arar, "DFT Leakage and the Choice of the Window Function," Aug. 23, 2017, retrieved from www.allaboutcircuits.com/technical-articles, 11 pages.
Tom Springer, "Sliding FFT computes frequency spectra in real time," EDN Magazine, Sep. 29, 1988, reprint taken from Electronic Circuits, Systems and Standards: The Best of EDN, edited by Ian Hickman, 1991, 7 pages.
United States Patent and Trademark Office, Final Office Action issued in connection with U.S. Appl. No. 16/238,189, dated Oct. 21, 2020, 23 pages.
Luo et al., "Compression History Identification for Digital Audio Signal," 2012 IEEE International Conference on Acoustics, Speech and Signal Processing (ICASSP), IEEE, 2012, 4 pages.
United States Patent and Trademark Office, "Notice of Allowance," issued in connection with U.S. Appl. No. 16/238,189, dated Feb. 25, 2021, 13 pages.
United States Patent and Trademark Office, "Non-Final Office Action," dated Feb. 26, 2019, in connection with U.S. Appl. No. 15/793,543 (14 pages).
United States Patent and Trademark Office, "Final Office Action," dated Jul. 12, 2019, in connection with U.S. Appl. No. 15/793,543 (14 pages).
United States Patent and Trademark Office, "Notice of Allowance," issued in connection with U.S. Appl. No. 15/793,543, dated Mar. 25, 2020, 18 pages.
United States Patent and Trademark Office, Non-Final Office Action issued in connection with U.S. Appl. No. 16/238,189, dated Jul. 13, 2020, (16 pages).
United States Patent and Trademark Office, "Supplemental Notice of Allowability," issued in connection with U.S. Appl. No. 15/942,369, dated Feb. 10, 2020, 2 pages.
United States Patent and Trademark Office, "Supplemental Notice of Allowability," issued in connection with U.S. Appl. No. 15/942,369, dated Mar. 17, 2020, 2 pages.
Patent Cooperation Treaty, "International Preliminary Report on Patentability," issued in connection with application No. PCT/US2018/057183, dated Apr. 28, 2020, 5 pages.
United States Patent and Trademark Office, "Corrected Notice of Allowability," issued in connection with U.S. Appl. No. 16/238,189, dated Jun. 3, 2021, 3 pages.
European Patent Office, "Extended European Search Report," issued in connection with European Patent Application No. 18871214.5-1207, dated Jul. 2, 2021, 8 pages.
European Patent Office, "Communication pursuant to Rules 70(2) and 70a(2) EPC," issued in connection with European Patent Application No. 18871214.5-1207, dated Jul. 20, 2021, 1 page.
United States Patent and Trademark Office, "Supplemental Notice of Allowability," issued in connection with U.S. Appl. No. 15/899,220, dated Jun. 29, 2020, 3 pages.
Korean Intellectual Property Office, "Notice of Preliminary Rejection," issued in connection with Korean Patent Application No. 10-2020-7012223, dated Aug. 5, 2021, 15 pages including partial English translation.
United States Patent and Trademark Office, "Non-Final Office Action," issued in connection with U.S. Appl. No. 16/843,582, dated Nov. 24, 2021, 8 pages.
United States Patent and Trademark Office, "Notice of Allowance," issued in connection with U.S. Appl. No. 16/843,582, dated Apr. 22, 2022, 7 pages.
Korean Intellectual Property Office, "Notice of Final Rejection," issued in connection with Korean Patent Application No. 10-2020-7012223, dated Feb. 21, 2022, 8 pages including partial English translation.
Korean Intellectual Property Office, "Notice of Allowance," issued in connection with Korean Patent Application No. 10-2020-7012223, dated Apr. 26, 2022, 4 pages including partial English translation.
Cho et al., "Coding History Detection of Speech Signal using Deep Neural Network," JBE, vol. 23, No. 1, pp. 86-92, Jan. 2018.
China National Intellectual Property Administration, "First Notification of Office Action", issued in connection with Application No. 201880081466.5, dated Dec. 29, 2022, 13 pages. (English Translation Included).
European Patent Office, "Communication Pursuant to Article 94(3) EPC," issued in connection with European Patent Application No. 18871214.5, dated Feb. 16, 2023, 5 pages.

* cited by examiner

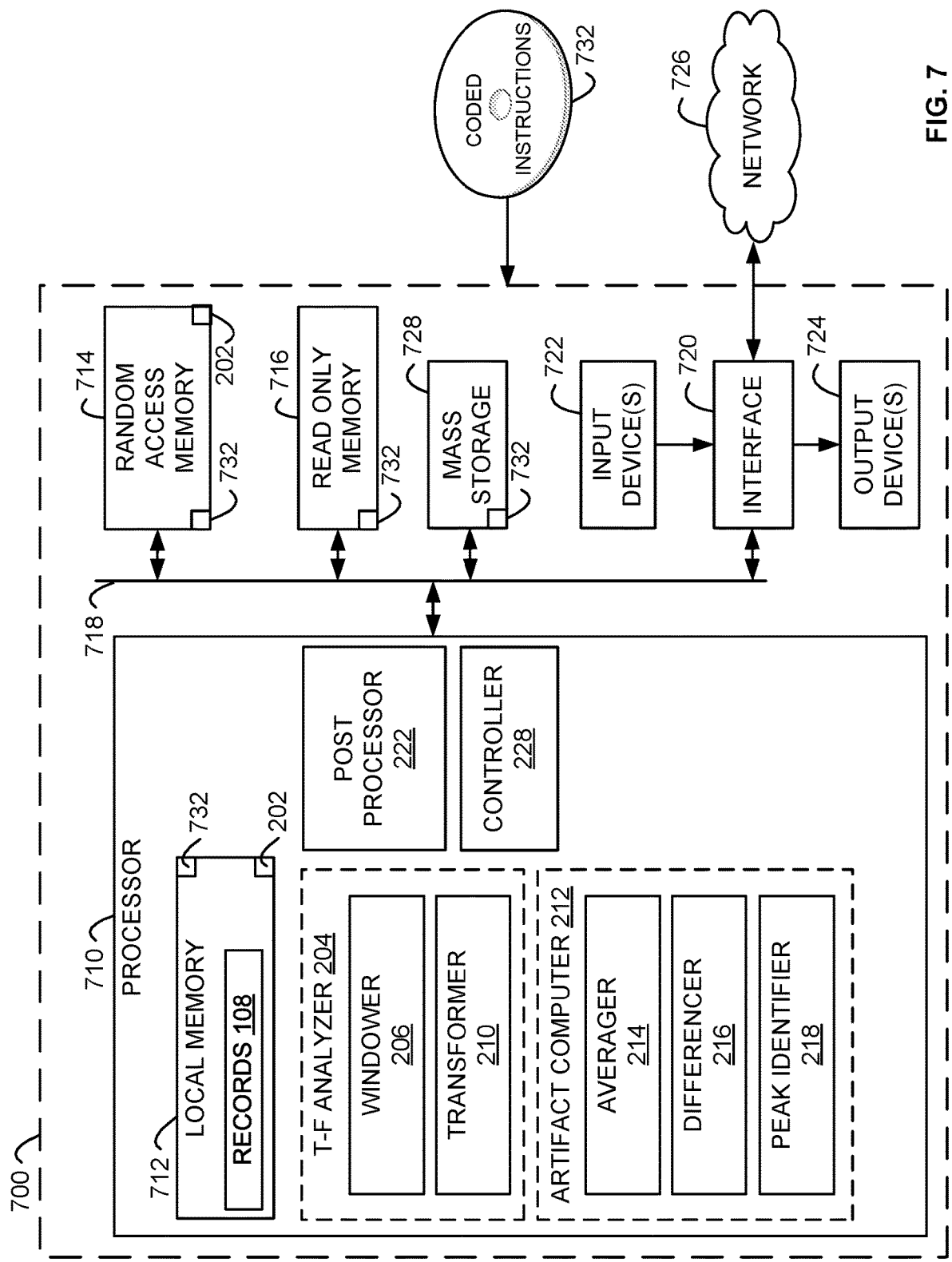

METHODS, APPARATUS AND ARTICLES OF MANUFACTURE TO IDENTIFY SOURCES OF NETWORK STREAMING SERVICES

RELATED APPLICATION

This patent claims the priority benefit of U.S. patent application Ser. No. 15/793,543, which was filed on Oct. 25, 2017. U.S. patent application Ser. No. 15/793,543 is hereby incorporated herein by reference in its entirety.

FIELD OF THE DISCLOSURE

This disclosure relates generally to network streaming services, and, more particularly, to methods, apparatus and articles of manufacture to identify sources of network streaming services.

BACKGROUND

Audience measurement entities (AMEs) perform, for example, audience measurement, audience categorization, measurement of advertisement impressions, measurement of media exposure, etc., and link such measurement information with demographic information. AMEs can determine audience engagement levels for media based on registered panel members. That is, an AME enrolls people who consent to being monitored into a panel. The AME then monitors those panel members to determine media (e.g., television programs or radio programs, movies, DVDs, advertisements (ads), websites, etc.) exposed to those panel members.

BRIEF DESCRIPTION OF THE DRAWINGS

FIG. 7 illustrates an example processor platform structured to execute the example machine-readable instructions of FIG. 6 to implement the example coding format identifier of FIGS. 1 and/or 2.

Figure 1:
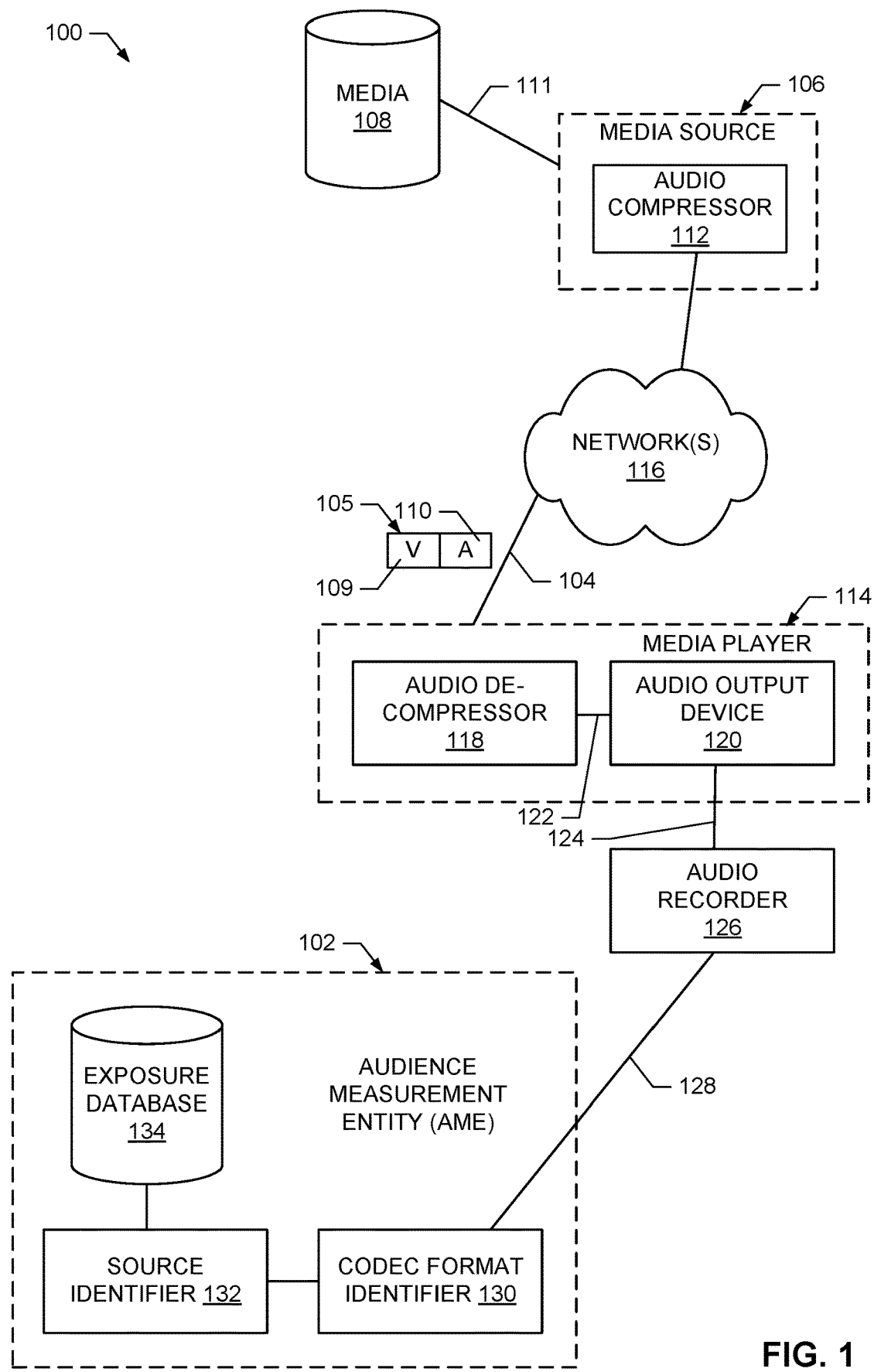
FIG. 1 illustrates an example environment in which an example AME, in accordance with this disclosure, identifies sources of network streaming services.

Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

AMEs typically identify the source of media (e.g., television programs or radio programs, movies, DVDs, advertisements (ads), websites, etc.) when measuring exposure to the media. In some examples, media has imperceptible audience measurement codes embedded therein (e.g., in an audio signal portion) that allow the media and a source of the media to be determined. However, media delivered via a network streaming service (e.g., NETFLIX®, HULU®, YOUTUBE®, AMAZON PRIME®, APPLE TV®, etc.) may not include audience measurement codes, rendering identification of the media source difficult, to determine the source of media.

It has been advantageously discovered that, in some instances, different sources of streaming media (e.g., NETFLIX®, HULU®, YOUTUBE®, AMAZON PRIME®, APPLE TV®, etc.) use different audio compression configurations to store and stream the media they host. In some examples, an audio compression configuration is a set of one or more parameters that define, among possibly other things, an audio coding format (e.g., MP1, MP2, MP3, AAC, AC-3, Vorbis, WMA, DTS, etc.), compression parameters, framing parameters, etc. Because different sources use different audio compression, the sources can be distinguished (e.g., identified, detected, determined, etc.) based on the audio compression applied to the media. The media is de-compressed during playback. In some examples, the de-compressed audio signal is compressed using different trial audio compression configurations for compression artifacts. Because compression artifacts become detectable (e.g., perceptible, identifiable, distinct, etc.) when a particular audio compression configuration matches the compression used during the original encoding, the presence of compression artifacts can be used to identify one of the trial audio compression configurations as the audio compression configuration used originally. After the compression configuration is identified, the AME can infer the original source of the audio. Example compression artifacts are discontinuities between points in a spectrogram, a plurality of points in a spectrogram that are small (e.g., below a threshold, relative to other points in the spectrogram), one or more values in a spectrogram having probabilities of occurrence that are disproportionate compared to other values (e.g., a large number of small values), etc. In instances where two or more sources use the same audio compression configuration and are associated with compression artifacts, the audio compression configuration may be used to reduce the number of sources to consider. Other methods may then be used to distinguish between the sources. However, for simplicity of explanation the examples disclosed herein assume that sources are associated with different audio compression configurations.

Disclosed examples identify the source(s) of media by identifying the audio compression applied to the media (e.g., to an audio portion of the media). In some examples, audio compression identification includes the identification of the compression that an audio signal has undergone, regardless of the content. Compression identification can include, for example, identification of the bit rate at which the audio data was encoded, the parameters used at the time-frequency decomposition stage, the samples in the audio signal where the framing took place before the windowing and transform were applied, etc. As disclosed herein, the audio compression can be identified from media that has been de-compressed and output using an audio device such as a speaker, and recorded. The recorded audio, which has undergone lossy compression and de-compression, can be re-compressed according to different trial audio compressions. In some examples, the trial re-compression that results in the largest compression artifacts is identified as the audio compression that was used to originally compress the media. The identified audio compression is used to identify the source of the media. While the examples disclosed herein only partially re-compress the audio (e.g., perform only the time-frequency analysis stage of compression), full re-compression may be performed.

Reference will now be made in detail to non-limiting examples of this disclosure, examples of which are illustrated in the accompanying drawings. The examples are described below by referring to the drawings.

FIG. 1 illustrates an example environment 100 in which an example AME 102, in accordance with this disclosure, identifies sources of network streaming services. To provide media 104 (e.g., a song, a movie 105 including video 109 and audio 110, a television show, a game, etc.), the example environment 100 includes one or more streaming media sources (e.g., NETFLIX®, HULU®, YOUTUBE®, AMAZON PRIME®, APPLE TV®, etc.), an example of which is designated at reference numeral 106. To form compressed audio signals (e.g., the audio 110 of the video program 105) from an audio signal 111, the example media source 106 includes an example audio compressor 112. In some examples, audio is compressed by the audio compressor 112 (or another compressor implemented elsewhere) and stored in the media data store 108 for subsequent recall and streaming. The audio signals may be compressed by the example audio compressor 112 using any number and/or type(s) of audio compression configurations (e.g., audio coding formats (e.g., MP1, MP2, MP3, AAC, AC-3, Vorbis, WMA, DTS, etc.), compression parameters, framing parameters, etc.) Media may be stored in the example media data store 108 using any number and/or type(s) of data structure(s). The media data store 108 may be implemented using any number and/or type(s) of non-volatile, and/or volatile computer-readable storage device(s) and/or storage disk(s).

To present (e.g., playback, output, display, etc.) media, the example environment 100 of FIG. 1 includes any number and/or type(s) of example media presentation device, one of which is designated at reference numeral 114. Example media presentation devices 114 include, but are not limited to a gaming console, a personal computer, a laptop computer, a tablet, a smart phone, a television, a set-top box, or, more generally, any device capable of presenting media. The example media source 106 provides the media 104 (e.g., the movie 105 including the compressed audio 110) to the example media presentation device 114 using any number and/or type(s) of example public, and/or public network(s) 116 or, more generally, any number and/or type(s) of communicative couplings.

To present (e.g., playback, output, etc.) audio (e.g., a song, an audio portion of a video, etc.), the example media presentation device 114 includes an example audio de-compressor 118, and an example audio output device 120. The example audio de-compressor 118 de-compresses the audio 110 to form de-compressed audio 122. In some examples, the audio compressor 112 specifies to the audio de-compressor 118 in the compressed audio 110 the audio compression configuration used by the audio compressor 112 to compress the audio. The de-compressed audio 122 is output by the example audio output device 120 as an audible signal 124. Example audio output devices 120 include, but are not limited, a speaker, an audio amplifier, headphones, etc. While not shown, the example media presentation device 114 may include additional output devices, ports, etc. that can present signals such as video signals. For example, a television includes a display panel, a set-top box includes video output ports, etc.

To record the audible audio signal 124, the example environment 100 of FIG. 1 includes an example recorder 126. The example recorder 126 of FIG. 1 is any type of device capable of capturing, storing, and conveying the audible audio signal 124. In some examples, the recorder 126 is implemented by a people meter owned and operated by The Nielsen Company, the Applicant of the instant application. In some examples, the media presentation device 114 is a device (e.g., a personal computer, a laptop, etc.) that can output the audio 124 and record the audio 124 with a connected or integral microphone. In some examples, the de-compressed audio 122 is recorded without being output. Audio signals 128 recorded by the example audio recorder 126 are conveyed to the example AME 102 for analysis.

To identify the media source 106 associated with the audible audio signal 124, the example AME 102 includes an example coding format identifier 130 and an example source identifier 132. The example coding format identifier 130 identifies the audio compression applied by the audio compressor 112 to form the compressed audio signal 110. The coding format identifier 130 identifies the audio compression from the de-compressed audio signal 124 output by the audio output device 120, and recorded by the audio recorder 126. The recorded audio 128, which has undergone lossy compression at the audio compressor 112, and de-compression at the audio de-compressor 118 is re-compressed by the coding format identifier 130 according to different trial audio compression types and/or settings. In some examples, the trial re-compression that results in the largest compression artifacts is identified by the coding format identifier 130 as the audio compression that was used at the audio compressor 112 to originally compress the media.

The example source identifier 130 of FIG. 1 uses the identified audio compression to identify the source 106 of the media 104. In some examples, the source identifier 130 uses a lookup table to identify, or narrow the search space for identifying the media source 106 associated with an audio compression identified by the coding format identifier 130. An association of the media 104 and the media source 106, among other data (e.g., time, day, viewer, location, etc.) is recorded in an example exposure database 134 for subsequent development of audience measurement statistics.

Figure 2:
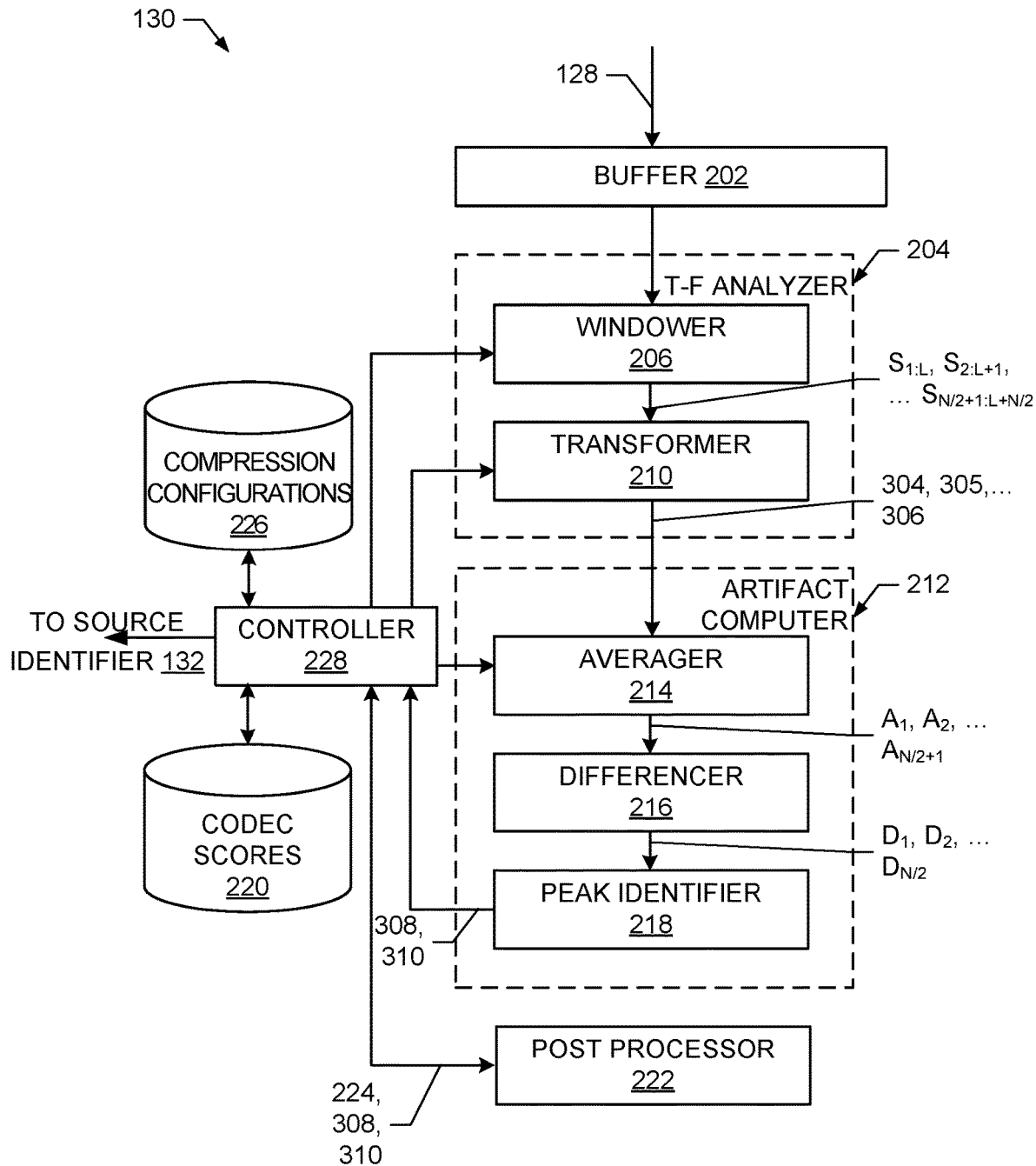
FIG. 2 is a block diagram illustrating an example implementation of the example coding format identifier of FIG. 1.
Figure 3:
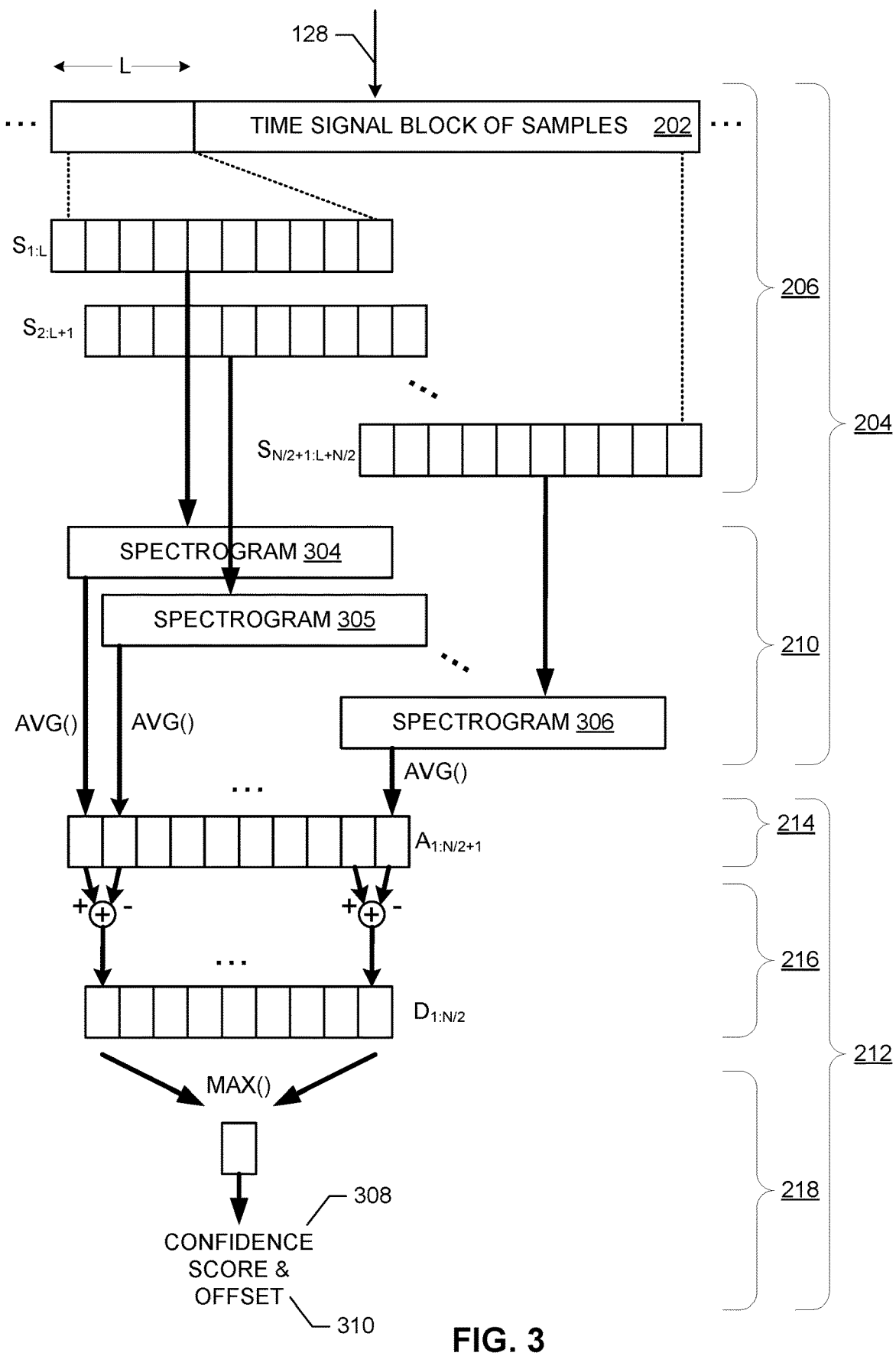
FIG. 3 is a diagram illustrating an example operation of the example coding format identifier of FIG. 2.

FIG. 2 is a block diagram illustrating an example implementation of the example coding format identifier 130 of FIG. 1. FIG. 3 is a diagram illustrating an example operation of the example coding format identifier 130 of FIG. 2. For ease of understanding, it is suggested that the interested reader refer to FIG. 3 together with FIG. 2. Wherever possible, the same reference numbers are used in FIGS. 2 and 3, and the accompanying written description to refer to the same or like parts.

To store (e.g., buffer, hold, etc.) incoming samples of the recorded audio 128, the example coding format identifier 130 includes an example buffer 202. The example buffer 202 of FIG. 2 may be implemented using any number and/or type(s) of non-volatile, and/or volatile computer-readable storage device(s) and/or storage disk(s).

To perform time-frequency analysis, the example coding format identifier 130 includes an example time-frequency analyzer 204. The example time-frequency analyzer 204 of FIG. 2 windows the recorded audio 128 into windows (e.g., segments of the buffer 202 defined by a sliding or moving window), and estimates the spectral content of the recorded audio 128 in each window.

To obtain portions of the example buffer 202, the example coding format identifier 130 includes an example windower

206. The example windower 206 of FIG. 2 is configurable to obtain from the buffer 202 windows $S_{1:L}, S_{2:L+1}, \ldots S_{N/2+1:L+N/2}$ (e.g., segments, portions, etc.) of L samples of the recorded audio 128 to be processed. The example windower 206 obtains a specified number of samples starting with a specified starting offset 1, 2, ... N/2+1 in the buffer 202. The windower 206 can be configured to apply a windowing function to the obtained windows $S_{1:L}, S_{2:L+1}, \ldots S_{N/2+1:L+N/2}$ of samples to reduce spectral leakage. Any number and/or type(s) of window functions may be implemented including, for example, a rectangular window, a sine window, a slope window, a Kaiser-Bessel derived window, etc.

To convert the samples obtained and windowed by the windower 206 to a spectrogram (three of which are designated at reference numeral 304, 305 and 306), the example coding format identifier 130 of FIG. 2 includes an example transformer 210. Any number and/or type(s) of transforms may be computed by the transformer 210 including, but not limited to, a polyphase quadrature filter (PQF), a modified discrete cosine transform (MDCT), hybrids thereof, etc. The example transformer 210 transforms each window $S_{1:L}, S_{2:L+1}, \ldots S_{N/2+1:L+N/2}$ into a corresponding spectrogram 304, 305, ... 306.

To compute compression artifacts, the example coding format identifier 130 of FIG. 2 includes an example artifact computer 212. The example artifact computer 212 of FIG. 2 detects small values (e.g., values that have been quantized to zero) in the spectrograms 304-306. Small values in the spectrograms 304-306 represent compression artifacts, and are used, in some examples, to determine when a trial audio compression corresponds to the audio compression applied by the audio compressor 112 (FIG. 1).

To compute an average of the values of a spectrogram 304-306, the artifact computer 212 of FIG. 2 includes an example averager 214. The example averager 214 of FIG. 2 computes an average $A_1, A_2, \ldots A_{N/2+1}$ of the values of corresponding spectrograms 304-306 for the plurality of windows $S_{1:L}, S_{2:L+1}, \ldots S_{N/2+1:L+N/2}$ of the block of samples 202. The averager 214 can compute various means, such as, an arithmetic mean, a geometric mean, etc. Assuming the audio content stays approximately the same between two adjacent spectrograms 304, 305, ... 306, the averages $A_1, A_2, \ldots A_{N/2+1}$ will also be similar. However, when audio compression configuration and framing match those used at the audio compressor 112, small values will appear in a particular spectrogram 304-306, and differences $D_1, D_2, \ldots D_{N/2}$ between the averages $A_1, A_2, \ldots A_{N/2+1}$ will occur. The presence of these small values in a spectrogram 304-306 and/or differences $D_1, D_2, \ldots D_{N/2}$ between averages $A_1, A_2, \ldots A_{N/2+1}$ can be used, in some examples, to identify when a trial audio compression configuration results in compression artifacts.

To detect the small values, the example artifact computer 212 includes an example differencer 216. The example differencer 216 of FIG. 2 computes the differences $D_1, D_2, \ldots D_{N/2}$ (see FIG. 3) between averages $A_1, A_2, \ldots A_{N/2+1}$ of the spectrograms 304-306 computed using different window locations 1, 2, ... N/2+1. When a spectrogram 304-306 has small values representing potential compression artifacts, it will have a smaller spectrogram average $A_1, A_2, \ldots A_{N/2+1}$ than the spectrograms 304-306 for other window locations. Thus, its differences $D_1, D_2, \ldots D_{N/2}$ from the spectrograms 304-306 for the other window locations will be larger than differences $D_1, D_2, \ldots D_{N/2}$ between other pairs of spectrograms 304-306. In some examples, the differencer 216 computes absolute (e.g., positive valued) differences.

To identify the largest difference $D_1, D_2, \ldots D_{N/2}$ between the averages $A_1, A_2, \ldots A_{N/2+1}$ of spectrograms 304-306, the example artifact computer 212 of FIG. 2 includes an example peak identifier 218. The example peak identifier 218 of FIG. 2 identifies the largest difference $D_1, D_2, \ldots D_{N/2}$ for a plurality of window locations 1, 2, ... N/2+1. The largest difference $D_1, D_2, \ldots D_{N/2}$ corresponding to the window location 1, 2, ... N/2+1 used by the audio compressor 112. As shown in the example of FIG. 3, the peak identifier 218 identifies the difference $D_1, D_2, \ldots D_{N/2}$ having the largest value. As will be explained below, in some examples, the largest value is considered a confidence score 308 (e.g., the greater its value the greater the confidence that a compression artifact was found), and is associated with an offset 310 (e.g., 1, 2, ..., N/2+1) that represents the location of the window $S_{1:L}, S_{2:L+1}, \ldots S_{N/2+1:L+N/2}$ associated with the average $A_1, A_2, \ldots A_{N/2+1}$. The example peak identifier 218 stores the confidence score 308 and the offset 310 in a coding format scores data store 220. The confidence score 308 and the offset 310 may be stored in the example coding format scores data store 220 using any number and/or type(s) of data structure(s). The coding format scores data store 220 may be implemented using any number and/or type(s) of non-volatile, and/or volatile computer-readable storage device(s) and/or storage disk(s).

Figure 4:
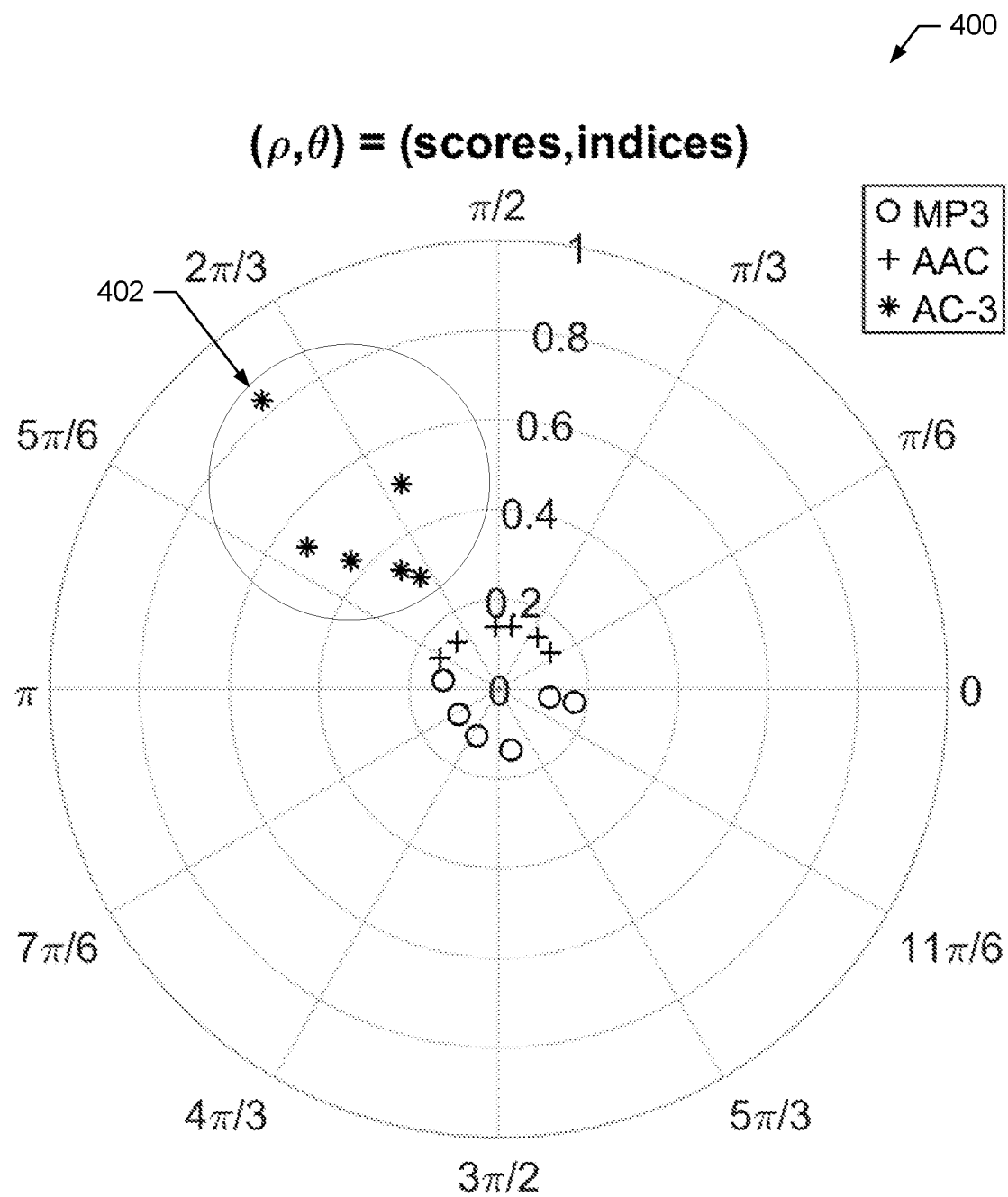
FIG. 4 is an example polar graph of example scores and offsets.

A peak in the differences $D_1, D_2, \ldots D_{N/2}$ nominally occurs every T samples in the signal. In some examples, T is the hop size of the time-frequency analysis stage of a coding format, which is typically half of the window length L. In some examples, confidence scores 308 and offsets 310 from multiple blocks of samples of a longer audio recording are combined to increase the accuracy of coding format identification. In some examples, blocks with scores under a chosen threshold are ignored. In some examples, the threshold can be a statistic computed from the differences, for example, the maximum divided by the mean. In some examples, the differences can also be first normalized, for example, by using the standard score. To combine confidence scores 308 and offsets 310, the example coding format identifier 130 includes an example post processor 222. The example post processor 222 of FIG. 2 translates pairs of confidence scores 308 and offsets 310 into polar coordinates. In some examples, a confidence score 308 is translated into a radius (e.g., expressed in decibels), and an offset 310 is mapped to an angle (e.g., expressed in radians modulo its periodicity). In some examples, the example post processor 222 computes a circular mean of these polar coordinate points (i.e., a mean computed over a circular region about an origin), and obtains an average polar coordinate point whose radius corresponds to an overall confidence score 224. In some examples, a circular sum can be computed, by multiplying the circular mean by the number of blocks whose scores was above the chosen threshold. The closer the pairs of points are to each other in the circle, and the further they are from the center, the larger the overall confidence score 224. In some examples, the post processor 222 computes a circular sum by multiplying the circular mean and the number of blocks whose scores were above the chosen threshold. The example post processor 222 stores the overall confidence score 224 in the coding format scores data store 220 using any number and/or type(s) of data structure(s). An example polar plot 400 of example pairs of scores and offsets is shown in FIG. 4, for five different audio compression configurations: MP3, AAC, AC-3, Vorbis and WMA.

As shown in FIG. 4, the AC-3 coding format has a plurality of points (e.g., see the example points in the example region 402) having similar angles (e.g., similar window offsets), and larger scores (e.g., greater radiuses) than the other coding formats. If a circular mean is computed for each configuration, the means for MP3, AAC, Vorbis and WMA would be near the origin, while the mean for AC-3 would be distinct from the origin, indicating that the audio 128 was originally compressed with the AC-3 coding format.

To store sets of audio compression configurations, the example coding format identifier 130 of FIG. 2 includes an example compression configurations data store 226. To control coding format identification, the example coding format identifier 130 of FIG. 2 includes an example controller 228. To identify the audio compression applied to the audio 128, the example controller 228 configures the time-frequency analyzer 204 with different compression configurations. For combinations of a trial compression configuration (e.g., AC-3) and each of a plurality of window offsets, the time-frequency analyzer 204 computes a spectrogram 304-306. The example artifact computer 212 and the example post processor 222 determine the overall confidence score 224 for each the trial compression configuration. The example controller 228 identifies (e.g., selects) the one of the trial compression configurations having the largest overall confidence score 224 as the compression configuration that had been applied to the audio 128.

The compression configurations may be stored in the example compression configurations data store 226 using any number and/or type(s) of data structure(s). The compression configurations data store 226 may be implemented using any number and/or type(s) of non-volatile, and/or volatile computer-readable storage device(s) and/or storage disk(s). The example controller 228 of FIG. 2 may be implemented using, for example, one or more of each of a circuit, a logic circuit, a programmable processor, a programmable controller, a graphics processing unit (GPU), a digital signal processor (DSP), an application specific integrated circuit (ASIC), a programmable logic device (PLD), a field programmable gate array (FPGA), and/or a field programmable logic device (FPLD).

While an example implementation of the coding format identifier 130 is shown in FIG. 2, other implementations, such as machine learning, etc. may additionally, and/or alternatively, be used. While an example manner of implementing the coding format identifier 130 of FIG. 1 is illustrated in FIG. 2, one or more of the elements, processes and/or devices illustrated in FIG. 2 may be combined, divided, re-arranged, omitted, eliminated and/or implemented in any other way. Further, the example time-frequency analyzer 204, the example windower 206, the example transformer 210, the example artifact computer 212, the example averager 214, the example differencer 216, the example peak identifier 218, the example post processor 222, the example controller 228 and/or, more generally, the example coding format identifier 130 of FIG. 2 may be implemented by hardware, software, firmware and/or any combination of hardware, software and/or firmware. Thus, for example, any of the example time-frequency analyzer 204, the example windower 206, the example transformer 210, the example artifact computer 212, the example averager 214, the example differencer 216, the example peak identifier 218, the example post processor 222, the example controller 228 and/or, more generally, the example coding format identifier 130 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example, time-frequency analyzer 204, the example windower 206, the example transformer 210, the example artifact computer 212, the example averager 214, the example differencer 216, the example peak identifier 218, the example post processor 222, the example controller 228, and/or the example coding format identifier 130 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example coding format identifier 130 of FIG. 1 may include one or more elements, processes and/or devices in addition to, or instead of, those illustrated in FIG. 2, and/or may include more than one of any or all the illustrated elements, processes and devices.

Figure 5:
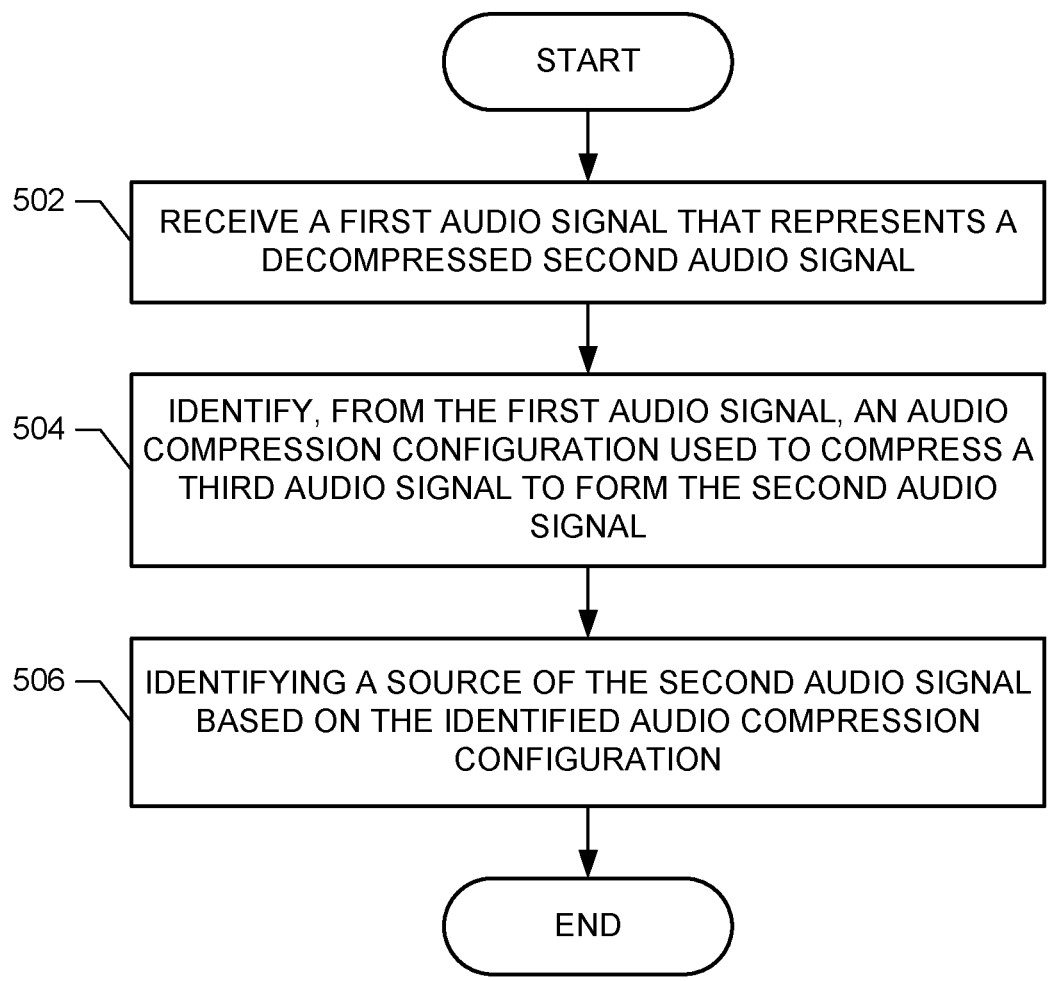
FIG. 5 is a flowchart representing example processes that may be implemented as machine-readable instructions that may be executed to implement the example AME to identify sources of network streaming services.

A flowchart representative of example machine-readable instructions for implementing the example AME 102 of FIG. 1 is shown in FIG. 5. In this example, the machine-readable instructions comprise a program for execution by a processor such as the processor 710 shown in the example processor platform 700 discussed below in connection with FIG. 7. The program may be embodied in software stored on a non-transitory computer-readable storage medium such as a CD, a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flowchart illustrated in FIG. 5, many other methods of implementing the example AME 102 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 5 begins at block 502, where the AME 102 receives a first audio signal (e.g., the example audio signal 128) that represents a decompressed a second audio signal (e.g., the example audio signal 110) (block 502). The example coding format identifier 130 identifies, from the first audio signal, an audio compression configuration used to compress a third audio signal (e.g., the example audio signal 111) to form the second audio signal (block 504). The example source identifier 132 identifies a source of the second audio signal based on the identified audio compression configuration (block 506). Control exits from the example program of FIG. 5.

Figure 6:
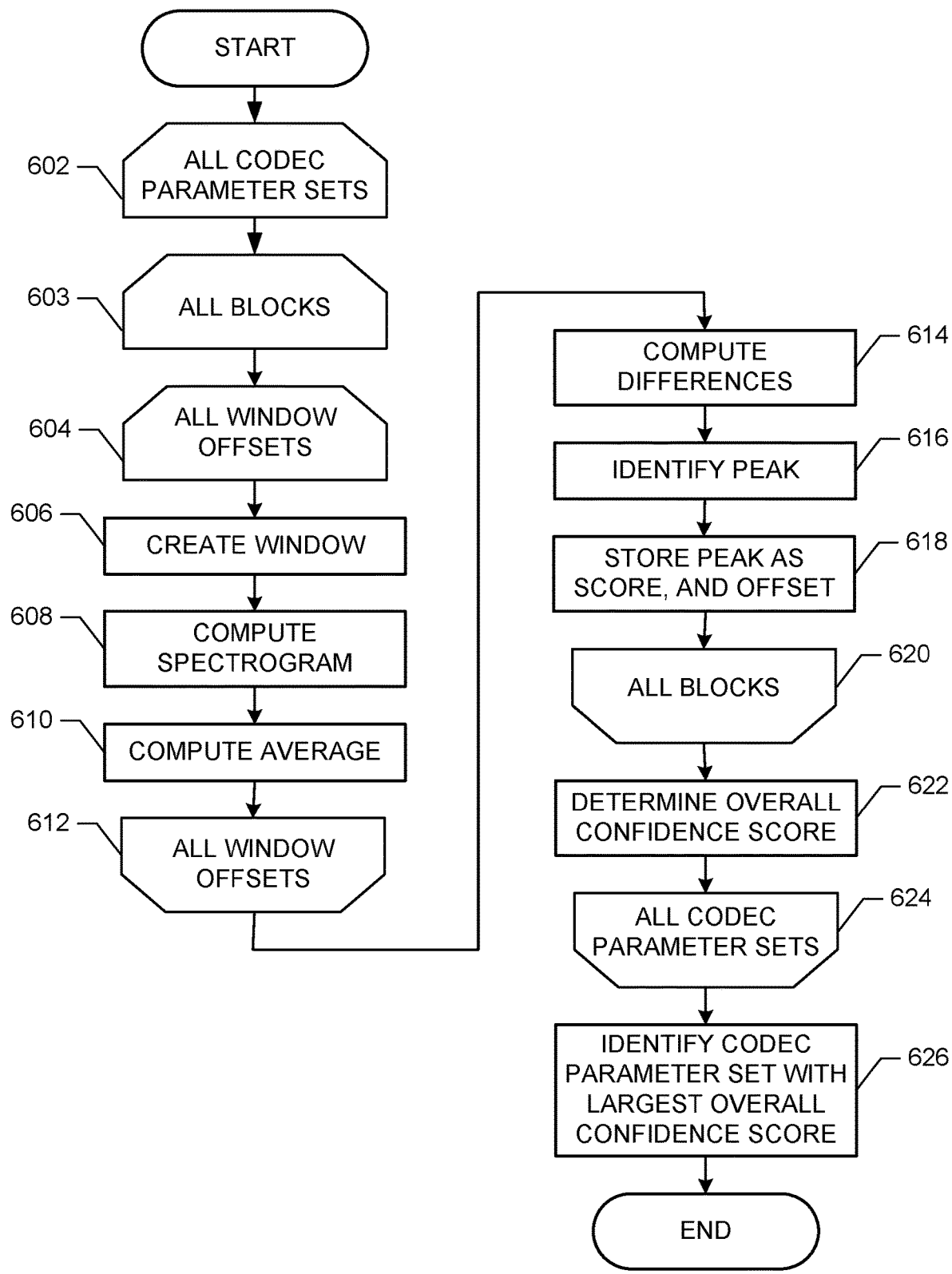
FIG. 6 is a flowchart representing another example processes that may be implemented as machine-readable instructions that may be executed to implement the example coding format identifier of FIGS. 1 and/or 2 to identify sources of network streaming services.

A flowchart representative of example machine-readable instructions for implementing the example coding format identifier 130 of FIGS. 1 and/or 2 is shown in FIG. 6. In this example, the machine-readable instructions comprise a program for execution by a processor such as the processor 710 shown in the example processor platform 700 discussed below in connection with FIG. 7. The program may be embodied in software stored on a non-transitory computer-readable storage medium such as a CD, a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flowchart illustrated in FIG. 6, many other methods of implementing the example coding format identifier 130 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 6 begins at block 602, where for each set of trial compression configuration, each block 202 of samples (block 603), and each window offset M (block 604), the example windower 206 creates a window $S_{M:L+M}$ (block 606), and the example transformer 210 computes a spectrogram 304-306 of the window $S_{M:L+M}$ (block 608). The average 214 computes an average $A_M$ of the spectrogram 304-306 (block 610). When the average $A_M$ of a spectrogram 304-306 has been computed for each window offset M (block 612), the example difference 216 computes differences $D_1, D_2, \ldots D_{N/2}$ between the pairs of the averages $A_M$ (block 614). The example peak identifier 218 identifies the largest difference (block 616), and stores the largest difference as the score 308 and the associated offset M as the offset 310 in the coding format scores data store 220 (block 618).

When all blocks have been processed (block 620), the example post processor 222 translates the score 308 and offset 310 pairs for the currently considered trial coding format parameter set into polar coordinates, and computes a circular mean of the pairs in polar coordinates as an overall confidence score for the currently considered compression configuration (block 622).

When all trial compression configurations have been processed (block 624), the controller 228 identifies the trial compression configuration set with the largest overall confidence score as the audio compression applied by the audio compressor 112 (block 626). Control then exits from the example program of FIG. 6.

As mentioned above, the example processes of FIGS. 5 and 6 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

FIG. 7 is a block diagram of an example processor platform 700 capable of executing the instructions of FIG. 6 to implement the coding format identifier 130 of FIGS. 1 and/or 2. The processor platform 700 can be, for example, a server, a personal computer, a workstation, or any other type of computing device.

The processor platform 700 of the illustrated example includes a processor 710. The processor 710 of the illustrated example is hardware. For example, the processor 710 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the example time-frequency analyzer 204, the example windower 206, the example transformer 210, the example artifact computer 212, the example averager 214, the example differencer 216, the example peak identifier 218, the example post processor 222, and the example controller 228.

The processor 710 of the illustrated example includes a local memory 712 (e.g., a cache). The processor 710 of the illustrated example is in communication with a main memory including a volatile memory 714 and a non-volatile memory 716 via a bus 718. The volatile memory 714 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 716 may be implemented by flash memory and/or any other desired type of memory device. Access to the main memory 714, 716 is controlled by a memory controller (not shown). In this example, the local memory 712 and/or the memory 714 implements the buffer 202.

The processor platform 700 of the illustrated example also includes an interface circuit 720. The interface circuit 720 may be implemented by any type of interface standard, such as an Ethernet interface, a universal serial bus (USB) interface, a Bluetooth® interface, a near field communication (NFC) interface, and/or a peripheral component interface (PCI) express interface.

In the illustrated example, one or more input devices 722 are connected to the interface circuit 720. The input device(s) 722 permit(s) a user to enter data and/or commands into the processor 710. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.) a tactile output device, a printer, and/or speakers. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, and/or network interface to facilitate exchange of data with external machines (e.g., computing devices of any kind) via a network 726 (e.g., an Ethernet connection, a digital subscriber line (DSL), a telephone line, a coaxial cable, a cellular telephone system, a Wi-Fi system, etc.). In some examples of a Wi-Fi system, the interface circuit 720 includes a radio frequency (RF) module, antenna(s), amplifiers, filters, modulators, etc.

The processor platform 700 of the illustrated example also includes one or more mass storage devices 728 for storing software and/or data. Examples of such mass storage devices 728 include floppy disk drives, hard drive disks, CD drives, Blu-ray disk drives, redundant array of independent disks (RAID) systems, and DVD drives.

Coded instructions 732 including the coded instructions of FIG. 6 may be stored in the mass storage device 728, in the volatile memory 714, in the non-volatile memory 716, and/or on a removable tangible computer-readable storage medium such as a CD or DVD.

From the foregoing, it will be appreciated that example methods, apparatus and articles of manufacture have been disclosed that identify sources of network streaming services. From the foregoing, it will be appreciated that methods, apparatus and articles of manufacture have been disclosed which enhance the operations of a computer to improve the correctness of and possibility to identify the sources of network streaming services. In some examples, computer operations can be made more efficient, accurate and robust based on the above techniques for performing source identification of network streaming services. That is, through the use of these processes, computers can operate more efficiently by relatively quickly performing source identification of network streaming services. Furthermore, example methods, apparatus, and/or articles of manufacture disclosed herein identify and overcome inaccuracies and inability in the prior art to perform source identification of network streaming services.

Example methods, apparatus, and articles of manufacture to identify the sources of network streaming services are disclosed herein. Further examples and combinations thereof include at least the following.

Example 1 is an apparatus that includes:

a coding format identifier to identify, from a received first audio signal representing a decompressed second audio signal, an audio compression configuration used to compress a third audio signal to form the second audio signal; and a source identifier to identify a source of the second audio signal based on the identified audio compression configuration.

Example 2 is the apparatus of example 1, further including:

a time-frequency analyzer to perform a first time-frequency analysis of a first block of the first audio signal according to a first trial compression configuration, and perform a second time-frequency analysis of the first block of the first audio signal according to a second trial compression configuration;

an artifact computer to determine a first compression artifact resulting from the first time-frequency analysis, and determine a second compression artifact resulting from the second time-frequency analysis; and a controller to select between the first trial compression configuration and the second trial compression configuration as the audio compression configuration based on the first compression artifact and the second compression artifact.

Example 3 is the apparatus of example 2, wherein the controller selects between the first trial compression configuration and the second trial compression configuration based on the first compression artifact and the second compression artifact includes comparing the first compression artifact and the second compression artifact.

Example 4 is the apparatus of example 2, wherein:

the time-frequency analyzer performs a third time-frequency analysis of a second block of the first audio signal according to the first trial compression configuration, and performs a fourth time-frequency analysis of the second block of the first audio signal according to the second trial compression configuration;

the artifact computer determines a third compression artifact resulting from the third time-frequency analysis, and determine a fourth compression artifact resulting from the fourth time-frequency analysis; and the controller selects between the first trial compression configuration and the second trial compression configuration as the audio compression configuration based on the first compression artifact, the second compression artifact, the third compression artifact, and the fourth compression artifact.

Example 5 is the apparatus of example 4, further including a post processor to combine the first compression artifact and the third compression artifact to form a first score, and combine the second compression artifact and the fourth compression artifact to form a second score, wherein the controller selects between the first trial compression configuration and the second trial compression configuration as the audio compression configuration by comparing the first score and the second score.

Example 6 is the apparatus of example 5, wherein the post processor combines the first compression artifact and the third compression artifact to form the first score by:

mapping the first compression artifact and a first offset associated with the first compression artifact to a first polar coordinate;

mapping the third compression artifact and a second offset associated with the second compression artifact to a second polar coordinate; and computing the first score as a circular mean of the first polar coordinate and the second polar coordinate.

Example 7 is the apparatus of example 1, wherein the first audio signal is recorded at a media presentation device.

Example 8 is a method that includes:

receiving a first audio signal that represents a decompressed second audio signal;

identify, from the first audio signal, an audio compression configuration used to compress a third audio signal to form the second audio signal; and identifying a source of the second audio signal based on the identified audio compression configuration.

Example 9 is the method of example 8, wherein the identifying the source of the second audio signal based on the identified audio compression configuration includes:

identifying a coding format based on the identified audio compression configuration; and identifying the source based on the coding format.

Example 10 is the method of example 8, wherein the identifying, from the first audio signal, the audio compression configuration includes:

performing a first time-frequency analysis of a first block of the first audio signal according to a first trial compression configuration;

determining a first compression artifact resulting from the first time-frequency analysis;

performing a second time-frequency analysis of the first block of the first audio signal according to a second trial compression configuration;

determining a second compression artifact resulting from the second time-frequency analysis; and selecting between the first trial compression configuration and the second trial compression configuration as the audio compression configuration based on the first compression artifact and the second compression artifact.

Example 11 is the method of example 10, wherein selecting between the first trial compression configuration and the second trial compression configuration based on the first compression artifact and the second compression artifact includes comparing the first compression artifact and the second compression artifact.

Example 12 is the method of example 10, further including:
performing a third time-frequency analysis of a second block of the first audio signal according to the first trial compression configuration;
determining a third compression artifact resulting from the third time-frequency analysis;
performing a fourth time-frequency analysis of the second block of the first audio signal according to the second trial compression configuration;
determining a fourth compression artifact resulting from the fourth time-frequency analysis; and
selecting between the first trial compression configuration and the second trial compression configuration as the audio compression configuration based on the first compression artifact, the second compression artifact, the third compression artifact, and the fourth compression artifact.

Example 13 is the method of example 12, wherein selecting between the first trial compression configuration and the second trial compression configuration as the audio compression configuration based on the first compression artifact, the second compression artifact, the third compression artifact, and the fourth compression artifact includes:
combining the first compression artifact and the third compression artifact to form a first score;
combining the second compression artifact and the fourth compression artifact to form a second score; and
comparing the first score and the second score.

Example 14 is the method of example 13, wherein the combining the first compression artifact and the third compression artifact to form the first score includes:
mapping the first compression artifact and a first offset associated with the first compression artifact to a first polar coordinate;
mapping the third compression artifact and a second offset associated with the second compression artifact to a second polar coordinate; and
computing the first score as a circular mean of the first polar coordinate and the second polar coordinate.

Example 15 is the method of example 8, wherein the first audio signal is recorded at a media presentation device.

Example 16 is the method of example 8, wherein the audio compression configuration indicates at least one of a time-frequency transform, a window function, or a window length.

Example 17 is a non-transitory computer-readable storage medium storing instructions that, when executed, cause a machine to perform operations including:
receiving a first audio signal that represents a decompressed second audio signal;
identify, from the first audio signal, an audio compression configuration used to compress a third audio signal to form the second audio signal; and
identifying a source of the second audio signal based on the identified audio compression configuration.

Example 18 is the non-transitory computer-readable storage medium of example 17, including further instructions that, when executed, cause the machine to identify the source of the second audio signal based on the identified audio compression configuration by:
identifying a coding format based on the identified audio compression configuration; and
identifying the source based on the coding format.

Example 19 is the non-transitory computer-readable storage medium of example 17, including further instructions that, when executed, cause the machine to identify, from the first audio signal, the audio compression configuration by:
performing a first time-frequency analysis of a first block of the first audio signal according to a first trial compression configuration;
determining a first compression artifact resulting from the first time-frequency analysis;
performing a second time-frequency analysis of the first block of the first audio signal according to a second trial compression configuration;
determining a second compression artifact resulting from the second time-frequency analysis; and
selecting between the first trial compression configuration and the second trial compression configuration as the audio compression configuration based on the first compression artifact and the second compression artifact.

Example 20 is the non-transitory computer-readable storage medium of example 19, including further instructions that, when executed, cause the machine to:
perform a third time-frequency analysis of a second block of the first audio signal according to the first trial compression configuration;
determine a third compression artifact resulting from the third time-frequency analysis;
perform a fourth time-frequency analysis of the second block of the first audio signal according to the second trial compression configuration;
determine a fourth compression artifact resulting from the fourth time-frequency analysis; and
select between the first trial compression configuration and the second trial compression configuration as the audio compression configuration based on the first compression artifact, the second compression artifact, the third compression artifact, and the fourth compression artifact.

Example 21 is the non-transitory computer-readable storage medium of example 20, including further instructions that, when executed, cause the machine to select between the first trial compression configuration and the second trial compression configuration as the audio compression configuration based on the first compression artifact, the second compression artifact, the third compression artifact, and the fourth compression artifact by:
combining the first compression artifact and the third compression artifact to form a first score;
combining the second compression artifact and the fourth compression artifact to form a second score; and
comparing the first score and the second score.

Example 22 is the non-transitory computer-readable storage medium of example 21, including further instructions that, when executed, cause the machine to combine the first compression artifact and the third compression artifact to form the first score by:
mapping the first compression artifact and a first offset associated with the first compression artifact to a first polar coordinate;
mapping the third compression artifact and a second offset associated with the second compression artifact to a second polar coordinate; and
computing the first score as a circular mean of the first polar coordinate and the second polar coordinate.

Example 23 is a method including:
receiving a first audio signal that represents a decompressed second audio signal, the second audio signal formed by compressing a third audio signal according to an audio compression configuration;
performing a first time-frequency analysis of a first block of the first audio signal according to a first trial compression configuration;

determining a first compression artifact resulting from the first time-frequency analysis;

performing a second time-frequency analysis of the first block of the first audio signal according to a second trial compression configuration;

determining a second compression artifact resulting from the second time-frequency analysis; and selecting between the first trial compression configuration and the second trial compression configuration as the audio compression configuration based on the first compression artifact and the second compression artifact.

Example 24 is the method of example 23, wherein the selecting between the first trial compression configuration and the second trial compression configuration as the audio compression configuration based on the first compression artifact and the second compression artifact includes comparing the first compression artifact and the second compression artifact.

Example 25 is the method of example 23, further including:

performing a third time-frequency analysis of a second block of the first audio signal according to the first trial compression configuration;

determining a third compression artifact resulting from the third time-frequency analysis;

performing a fourth time-frequency analysis of the second block of the first audio signal according to the second trial compression configuration;

determining a fourth compression artifact resulting from the fourth time-frequency analysis; and selecting between the first trial compression configuration and the second trial compression configuration as the audio compression configuration based on the first compression artifact, the second compression artifact, the third compression artifact, and the fourth compression artifact.

Example 26 is the method of example 25, wherein the selecting between the first trial compression configuration and the second trial compression configuration as the audio compression configuration based on the first compression artifact, the second compression artifact, the third compression artifact, and the fourth compression artifact includes:

combining the first compression artifact and the third compression artifact to form a first score;

combining the second compression artifact and the fourth compression artifact to form a second score; and comparing the first score and the second score.

Example 27 is the method of example 26, wherein the combining the first compression artifact and the third compression artifact to form the first score includes:

mapping the first compression artifact and a first offset associated with the first compression artifact to a first polar coordinate;

mapping the third compression artifact and a second offset associated with the second compression artifact to a second polar coordinate; and computing the first score as a circular mean of the first polar coordinate and the second polar coordinate.

"Including" and "comprising" (and all forms and tenses thereof) are used herein to be open ended terms. Thus, whenever a claim lists anything following any form of "include" or "comprise" (e.g., comprises, includes, comprising, including, having, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a buffer to store an audio signal;
   a windower implemented via a logic circuit to form a plurality of windows from the audio signal;
   a transformer implemented via the logic circuit to form:
      a first plurality of spectrograms based on the plurality of windows and a first trial compression configuration; and
      a second plurality of spectrograms based on the plurality of windows and a second trial compression configuration;
   an average computer implemented via the logic circuit to compute:
      a first plurality of averages corresponding to data within the first plurality of spectrograms; and
      a second plurality of averages corresponding to data within the second plurality of spectrograms;
   a difference computer implemented via the logic circuit to compute:
      a first plurality of differences between the first plurality of averages; and
      a second plurality of differences between the second plurality of averages;
   a peak identifier implemented via the logic circuit to identify:
      a first peak as the largest value of the first plurality of differences;
      a second peak as the largest value of the second plurality of differences;
   a post processor implemented via the logic circuit to:
      form a first score based on the first peak; and
      form a second score based on the second peak; and
   a controller implemented via the logic circuit to select one of the first trial compression configuration or the second trial compression configuration based on a comparison of the first score and second score, the selected trial compression configuration corresponding to a source of the audio signal.

2. The apparatus of claim 1, wherein:
   the audio signal is a first audio signal;
   a media source is to use a compression configuration to form a second audio signal; and
   a media player is to decompress the second audio signal to form the first audio signal.

3. The apparatus of claim 1,
   further including an artifact computer implemented via the logic circuit to identify a compression artifact based on the first peak.

4. The apparatus of claim 3, wherein the compression artifact is one or more of a) a discontinuity between data points in the first plurality of spectrograms, and b) a data point in the first plurality of spectrograms having a magnitude below a first threshold.

5. The apparatus of claim 1, wherein:
the post processor implemented via the logic circuit is further to form the first score based on the first peak and an offset between the plurality of windows.

6. A method to identify an audio signal, the method comprising:
storing an audio signal;
forming a plurality of windows from the audio signal;
forming a first plurality of spectrograms based on the plurality of windows and a first trial compression configuration;
forming a second plurality of spectrograms based on the plurality of windows and a second trial compression configuration;
computing a first plurality of averages corresponding to data within the first plurality of spectrograms;
computing a second plurality of averages corresponding to data within the second plurality of spectrograms;
computing a first plurality of differences between the first plurality of averages; and
computing a second plurality of differences between the second plurality of averages;
identifying a first peak as the largest value of the first plurality of differences;
identifying a second peak as the largest value of the second plurality of differences;
forming a first score based on the first peak;
forming a second score based on the second peak; and
selecting the first trial compression configuration or the second trial compression configuration based on a comparison of the first score and second score, the selected trial compression configuration corresponding to a source of the audio signal.

7. The method of claim 6, wherein:
the audio signal is a first audio signal;
a media source is to use a compression configuration to form a second audio signal; and
a media player is to decompress the second audio signal to form the first audio signal.

8. The method of claim 6, further including:
identifying a compression artifact based on the first peak.

9. The method of claim 8, wherein the compression artifact is one or more of a) a discontinuity between data points in the first plurality of spectrograms, and b) a data point in the first plurality of spectrograms having a magnitude below a first threshold.

10. The method of claim 6, further including:
forming the first score based on the first peak and an offset between the plurality of windows.

11. At least one non-transitory computer-readable storage medium comprising instructions that, when executed, cause at least one processor to at least:
store an audio signal;
form a plurality of windows from the audio signal;
form a first plurality of spectrograms based on the plurality of windows and a first trial compression configuration;
form a second plurality of spectrograms based on the plurality of windows and a second trial compression configuration;
compute a first plurality of averages corresponding to data within the first plurality of spectrograms;
compute a second plurality of averages corresponding to data within the second plurality of spectrograms;
compute a first plurality of differences between the first plurality of averages; and
compute a second plurality of differences between the second plurality of averages;
identify a first peak as the largest value of the first plurality of differences as a compute artifact;
identify a second peak as the largest value of the second plurality of differences as a compute artifact;
form a first score based on the first peak;
form a second score based on the second peak; and
select one of the first trial compression configuration or the second trial compression configuration based on a comparison of the first score and second score, the selected trial compression configuration corresponding to a source of the audio signal.

12. The at least one non-transitory computer-readable storage medium of claim 11, wherein the instructions, when executed, cause the at least one processor to identify a compression artifact based on the first peak.

13. The at least one non-transitory computer-readable storage medium of claim 12, wherein the compression artifact is one or more of a) a discontinuity between data points in the first plurality of spectrograms, and b) a data point in the first plurality of spectrograms having a magnitude below a first threshold.

14. The at least one non-transitory computer-readable storage medium of claim 11, wherein the instructions, when executed, cause the at least one processor to at least:
form the first score based on the first peak and an offset between the plurality of windows.

* * * * *